United States Patent
Blanc et al.

(10) Patent No.: US 11,271,224 B2
(45) Date of Patent: *Mar. 8, 2022

(54) METHOD FOR PRODUCING A MEMBRANE ELECTRODE ASSEMBLY FOR A FUEL CELL

(71) Applicant: COMPAGNIE GENERALE DES ETABLISSEMENTS MICHELIN, Clermont-Ferrand (FR)

(72) Inventors: Claude Blanc, Clermont-Ferrand (FR); Arnaud Grand-Jean, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 210 days.

This patent is subject to a terminal disclaimer.

(21) Appl. No.: 16/468,866

(22) PCT Filed: Dec. 8, 2017

(86) PCT No.: PCT/FR2017/053465
§ 371 (c)(1),
(2) Date: Jun. 12, 2019

(87) PCT Pub. No.: WO2018/109334
PCT Pub. Date: Jun. 21, 2018

(65) Prior Publication Data
US 2020/0075970 A1  Mar. 5, 2020

(30) Foreign Application Priority Data

Dec. 12, 2016 (FR) ...................................... 1662300

(51) Int. Cl.
*H01M 8/0286* (2016.01)
*H01M 8/0273* (2016.01)
(Continued)

(52) U.S. Cl.
CPC ....... *H01M 8/0286* (2013.01); *H01M 4/8835* (2013.01); *H01M 4/92* (2013.01);
(Continued)

(58) Field of Classification Search
None
See application file for complete search history.

(56) References Cited

U.S. PATENT DOCUMENTS 8,486,578 B2   7/2013  Ishida et al.
2003/0013602 A1  1/2003  Uchida et al.
(Continued)

FOREIGN PATENT DOCUMENTS

| EP | 1 304 754 A1 | 4/2003 |
| EP | 2 309 577 A1 | 4/2011 |
| EP | 2 704 241 A1 | 3/2014 |

OTHER PUBLICATIONS

International Search Report dated Jan. 18, 2018, in corresponding PCT/FR2017/053465 (6 pages).

*Primary Examiner* — Lisa S Park
(74) *Attorney, Agent, or Firm* — Venable LLP

(57) ABSTRACT

A method for manufacturing a membrane-electrode assembly for a fuel cell comprises the following steps: a first step during which a reinforcement (2) is deposited on a first face of an ion-exchanging membrane (1), the membrane being held on a support film; a second step during which the membrane is unglued from the support film; a third step during which the reinforcement (2') is deposited on the second face of the ion-exchanging membrane; and a fourth step during which a chemical catalyst element is deposited on the parts left free of the first and second faces of the membrane.

7 Claims, 2 Drawing Sheets

(51) Int. Cl.
    *H01M 8/1004*     (2016.01)
    *H01M 4/92*     (2006.01)
    *H01M 4/88*     (2006.01)
    *H01M 8/10*     (2016.01)

(52) U.S. Cl.
    CPC ....... *H01M 8/0273* (2013.01); *H01M 8/1004* (2013.01); *H01M 2008/1095* (2013.01)

(56) References Cited

U.S. PATENT DOCUMENTS

| | | |
|---|---|---|
| 2003/0078157 A1 | 4/2003 | Matsuoka et al. |
| 2009/0181277 A1 | 7/2009 | Okanishi et al. |
| 2009/0208805 A1 | 8/2009 | Wakabayashi et al. |
| 2010/0038020 A1* | 2/2010 | Hori .................... H01M 8/1004 156/196 |
| 2011/0136038 A1 | 6/2011 | Ishida et al. |
| 2014/0065519 A1 | 3/2014 | Vincent et al. |
| 2016/0172701 A1* | 6/2016 | Desie .................... H01M 8/109 428/220 |
| 2018/0145344 A1 | 5/2018 | Blanc |
| 2018/0151906 A1 | 5/2018 | Grandjean |
| 2018/0375117 A1 | 12/2018 | Grandjean |
| 2019/0013526 A1 | 1/2019 | Blanc |
| 2020/0083540 A1 | 3/2020 | Blanc et al. |

\* cited by examiner

METHOD FOR PRODUCING A MEMBRANE ELECTRODE ASSEMBLY FOR A FUEL CELL

FIELD OF THE INVENTION

The present invention relates to the field of fuel cells, and more particularly to the field of the manufacturing and assembling of fuel cells.

A fuel cell makes it possible to generate electrical energy through an electrochemical reaction from a fuel, generally hydrogen, and an oxidant, generally oxygen.

A fuel cell of the type with membrane exchanging protons with solid electrolyte (PEMFC) usually comprises a stack of elementary cells, in plate form, forming electrochemical generators, each of the cells being separated from the adjacent cells by bipolar plates. Each cell comprises an anode element and a cathode element, separated by a solid electrolyte in the form of an ion-exchanging membrane, produced for example in a sulfurated perfluorinated polymer material.

This assembly comprising the cathode element, the anode element and the solid electrolyte forms a membrane-electrode assembly, also called MAE. According to a standard variant embodiment, each bipolar plate ensures, on one side, the supply of oxidant for the adjacent cell on this side and, on the other side, the supply of oxidant for the adjacent cell on this other side, the supplies ensured by the bipolar plates being provided in parallel. Gas diffusion layers, for example produced in carbon fabric, are installed on either side of the MAEs to ensure the electrical conduction and the uniform intake of the reagent gases supplied by the bipolar plates.

To improve the efficiency of the chemical reactions at the anode and at the cathode, a catalyst, generally platinum, is used in the stack. This catalyst can be positioned either on the membrane, or on the gas diffusion layer.

The existing techniques for depositing catalyst on a membrane are not satisfactory, because, since the membrane is highly sensitive to humidity, it tends to shrink upon the deposition of catalyst on a first face, which makes the depositing of catalyst on the second face of the membrane difficult.

The present invention thus aims to propose a method for depositing catalyst on a polymer membrane for a fuel cell that makes it possible to remedy the abovementioned drawbacks.

BRIEF DESCRIPTION OF THE INVENTION

Thus, the invention relates to a method for manufacturing a membrane-electrode assembly for a fuel cell, the method comprising the following steps:
  A first step during which a reinforcement is deposited on a first face of an ion-exchanging membrane, the membrane being held on a support film,
  A second step during which the membrane is unglued from the support film,
  A third step during which a reinforcement is deposited on the second face of the ion-exchanging membrane, and
  A fourth step during which a chemical catalyst element is deposited on the parts left free of the first and second faces of the membrane.

It is specified here that, hereinafter in the description, the expression "chemical catalyst element" will be able to be replaced by the term "catalyst" for the purpose of simplifying the explanation. This chemical catalyst element is preferentially an ink comprising platinum, water and solvents.

This invention thus makes it possible to remedy the abovementioned drawbacks by proposing a method in which the membrane is held during the two catalyst deposition steps, which prevents it from shrinking. In effect, during the step of depositing the catalyst, the membrane is held on its periphery by reinforcing elements which will have been installed in advance. In effect, the reinforcing elements are polymer films which are positioned so as to sandwich the edge of the membrane over all its periphery, and which leave a central part of the membrane free.

Thus, the catalyst must then be deposited not on the reinforcing elements, but only on the central part of the membrane that is left free. To do this, the fourth step is advantageously implemented by a method that makes it possible to produce a pattern rather than a continuous deposition. Thus, this fourth step is advantageously performed by a method included in the group comprising: flexography, screenprinting, spraying. These various methods will be detailed later with the aid of figures.

It is known that, in a fuel cell stack, it is necessary to position seals on either side of each elementary cell, and to do so in order to ensure a sealing of the whole in the final stack. In one embodiment of the invention, the seals are installed in advance on the reinforcing elements, before the insertion of the membrane. Such an embodiment presents two advantages: first of all, since the seals are installed before the insertion of the membrane, the steps of polymerization of the seal in the oven are not undergone by the membrane; furthermore, in case of a defect in the manufacturing of the seal, only a reinforcement is lost, and not the membrane. However, it has been found that, depending on the method employed for the deposition of the catalyst, the presence of an excess thickness due to the seals was a potential drawback.

To remedy that, the invention relates also to a method for manufacturing an elementary cell for a fuel cell comprising two identical bipolar plates, surrounding a membrane-electrode assembly and two gas diffusion layers, the method comprising the following steps:
  A sheet of a material used for forming seals for a fuel cell is placed on a cutting anvil,
  Two clamps are installed to position the sheet on the cutting press,
  A first cutting is performed with a tool whose template depends on the form of the bipolar plates of the elementary cell, the purpose of this first cutting being to delimit the internal form of the seal,
  The waste from the first cutting is eliminated while keeping the seal in place by virtue of the clamps,
  A membrane-electrode assembly manufactured according to a method according to the invention is installed on the seal,
  A second cutting is performed with a tool making it possible to delimit the outer form of the seal, and
  The waste from the second cutting is eliminated.

BRIEF DESCRIPTION OF THE FIGURES

Other objectives and advantages of the invention will become clearly apparent from the following description of a preferred but nonlimiting embodiment, illustrated by the following figures in which.

DESCRIPTION OF THE BEST EMBODIMENT OF THE INVENTION

Figure 1:
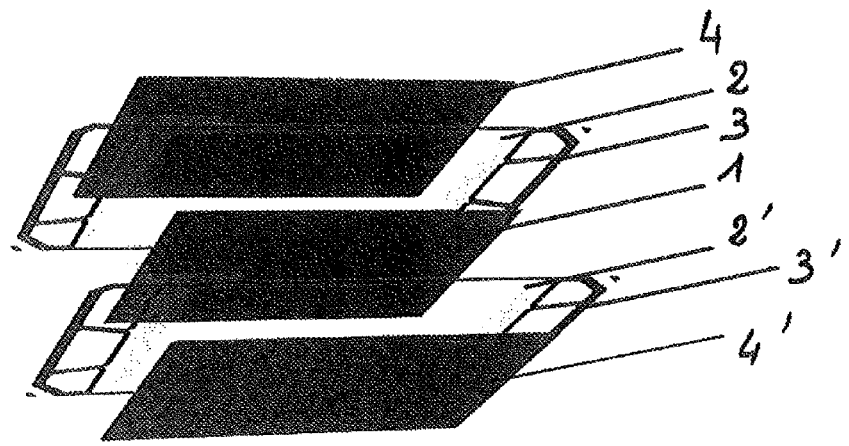
FIG. 1 presents a membrane-electrode assembly for a fuel cell.

FIG. 1 shows a membrane-electrode assembly for a fuel cell. This assembly comprises an ion-exchanging membrane 1, reinforcing elements 2 and 2', seals 3 and 3', and gas diffusion layers 4 and 4'.

As indicated in the preamble of the present application, in a fuel cell, a choice can be made to deposit the catalyst on the membrane 1 or on the gas diffusion layers 4 and 4'. The present invention relates to the first possibility, namely the deposition of the catalyst on the membrane 1.

Thus, a method according to the invention proceeds as follows:

The membrane 1 is delivered on a support film made of a plastic material, for example PET, and the reinforcements 2 and 2' are placed on either side of the membrane, The membrane 1, bearing the reinforcements, is then catalyzed on each of the faces; to do this, a method is used that makes it possible to perform a deposition in the form of patterns, such as screenprinting, which will be described with the aid of FIG. 3, or flexography which will be described with the aid of FIG. 4, The seals 3 and 3' are then installed by using a method according to the invention, Finally, the gas diffusion layers 4 and 4' are installed.

Figure 2:
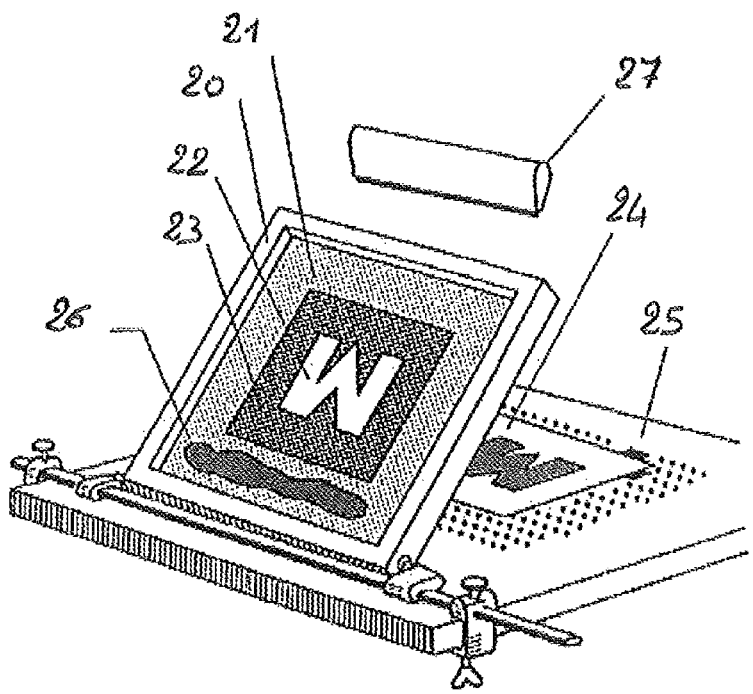
FIG. 2 illustrates a screenprinting method implemented in an embodiment of the invention.

FIG. 2 shows a system that makes it possible to implement a screenprinting method. This system comprises a screen or frame 20, formed by a fabric made of PET 21, also called lattice, whose meshes and wire diameter can be adapted to the different uses.

For the creation of the pattern to be produced, the fabric is dipped in a photosensitive product called emulsion on which is deposited a stencil corresponding to the pattern to be produced. In the present case, the pattern to be produced corresponds to the central part of an ion-exchanging membrane, left free after the installation of the reinforcements.

After having undergone an exposure to a UV lamp, the photosensitive product hardens apart from the zone marked by the stencil. The surplus is then cleaned. Thus, the lattice then comprises open meshes 22, forming the pattern, and blocked meshes 23.

Once this frame, or screen, has been manufactured, it is then possible to perform a deposition of catalyst by screenprinting. To do this, the membrane 24, catalyzed on one face, and bearing the reinforcements, is installed on the support 25, the non-catalyzed face being installed uppermost. The screen 20 is then positioned on the support 25, above the membrane 24. A sufficient quantity of catalyst 26 is then deposited on the frame, and spread evenly over the pattern but without pressing too strongly to avoid making it pass through the lattice. This operation is called "coating".

Then, a squeegee 27 formed by a polyurethane or metal profile whose hardness and stiffness can be adapted, is passed all along the profile with a variable angle close to 45°. It is specified here that the frame 20 is installed a little above the support 25 so as to avoid a contact between the two before the passing of the squeegee.

The squeegee 27 will then force the lattice 21 to be deformed, bringing it into contact with the support 32. The catalyst is then forced on the passage of the squeegee through the lattice to be deposited on the membrane 24.

The squeegee also makes it possible to scrape away the surplus catalyst from the surface of the screen, the latter then being ready for a second deposition.

Figure 3:
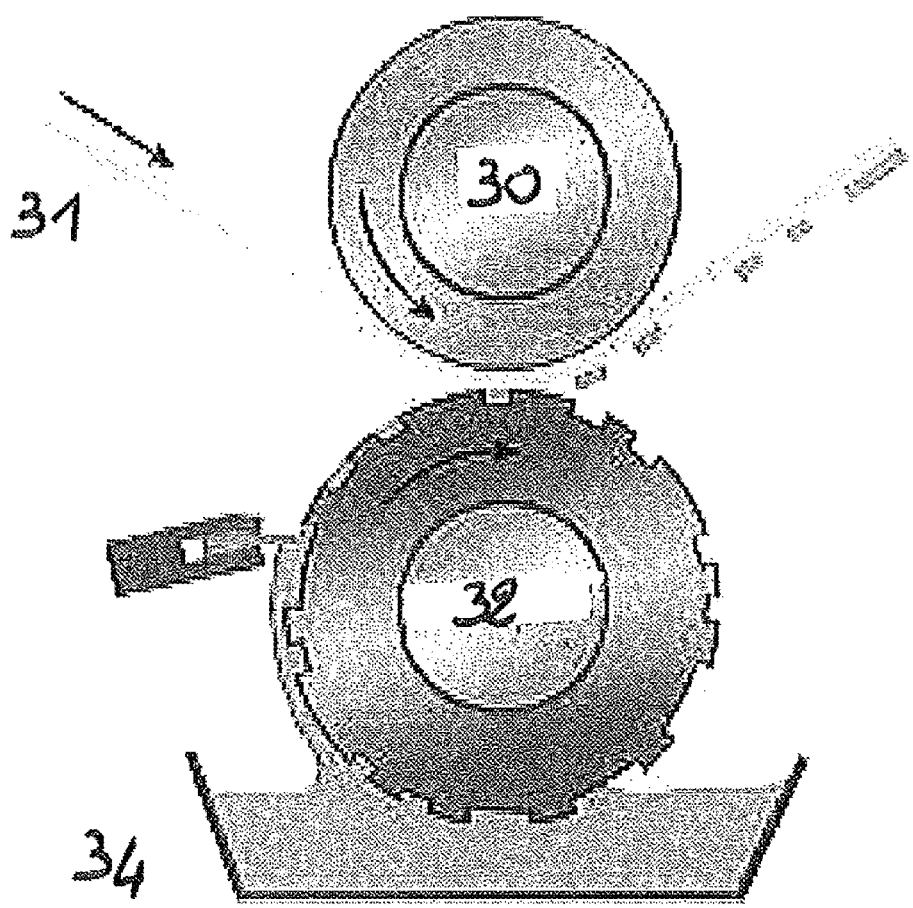
FIG. 3 illustrates a flexography method implemented in an embodiment of the invention.

FIG. 3 makes it possible to illustrate another method for performing this deposition in pattern form, namely a flexography method, also called "ink pad". The system shown in FIG. 4 comprises a support roller 30, on which is installed the membrane 31 to be catalyzed. The system also comprises an inking roller 32 on which the pattern to be deposited is formed as an overthickness. The system further comprises a small roller 33 intended to eliminate, after soaking in the tank, the ink present on the parts of the inking roller not forming the pattern.

Thus, upon contact between the support roller 30 and the inking roller 32, the pattern drawn on the inking roller 32 is transferred to the membrane 31.

It is observed, in the description of methods such as screenprinting or flexography, that the presence of an overthickness on the membrane could pose problems for the deposition of the catalyst. Thus, it seems shrewd to perform the deposition of catalyst before the installation of the seals of each side of the membrane.

Thus, in a particular embodiment, the seals are flat seals deposited on the reinforcement-catalyzed membrane-reinforcement assembly. An example of a seal cutting and deposition method that can be implemented for this purpose will be described hereinbelow.

The invention claimed is:

1. A method for manufacturing a membrane-electrode assembly for a fuel cell, the method comprising, in the following order, the steps:
   (a) depositing a reinforcement on a first face of an ion-exchanging membrane, the membrane being held on a support film;
   (b) ungluing the membrane from the support film;
   (c) depositing a reinforcement on a second face of the membrane positioned such that the reinforcement elements sandwich the edge of the membrane along all of a periphery of the membrane; and
   (d) depositing a chemical catalyst element only on a central part of the first and second faces of the membrane.

2. The method according to claim 1, wherein the chemical catalyst element is an ink comprising platinum, water and solvents.

3. The method according to claim 1, wherein the support film is a film made of a plastic material.

4. The method according to claim 3, wherein the plastic material is polyethylene terephthalate.

5. The method according to claim 1, wherein step (d) is performed by a method selected from the group consisting of flexography, screenprinting and spraying.

6. The method according to claim 1, wherein seals are present on the reinforcements.

7. A method for manufacturing an elementary cell for a fuel cell comprising two identical bipolar plates, surrounding a membrane-electrode assembly and two gas diffusion layers, the method comprising the following steps:
   (a) placing a sheet of a material, used for forming seals for a fuel cell, on a cutting anvil;
   (b) installing two clamps for positioning the sheet on a cutting press;
   (c) cutting, with a tool a template of which depends on a form of the bipolar plates of the elementary cell, to delimit an internal form of a seal;
   (d) eliminating waste from the cutting of step (c) while keeping the seal in place with the clamps;

(e) installing a membrane-electrode assembly, made by the method according to claim 1, on the seal;
(f) cutting to delimit an outer form of the seal; and
(g) eliminating waste from the cutting of step (f).

\* \* \* \* \*